United States Patent [19]

Inatomi

[11] Patent Number: 5,598,522
[45] Date of Patent: Jan. 28, 1997

[54] COMMAND PROCESSING SYSTEM USED UNDER GRAPHICAL USER INTERFACE UTILIZING POINTING DEVICE FOR SELECTION AND DISPLAY OF COMMAND WITH EXECUTION OF CORRESPONDING PROCESS

[75] Inventor: Masayuki Inatomi, Kawasaki, Japan

[73] Assignee: Fujitsu Limited, Kawasaki, Japan

[21] Appl. No.: 274,844

[22] Filed: Jul. 14, 1994

[30] Foreign Application Priority Data

Aug. 25, 1993 [JP] Japan ................. 5-210319

[51] Int. Cl.$^6$ ................................................. G06F 3/00
[52] U.S. Cl. ................................................. 395/352
[58] Field of Search ........................ 395/155–161; 345/146, 902

[56] References Cited

U.S. PATENT DOCUMENTS

| | | | |
|---|---|---|---|
| 4,686,522 | 8/1987 | Hernandez et al. | 395/156 |
| 4,823,283 | 4/1989 | Diehm et al. | 395/156 |
| 5,119,475 | 6/1992 | Smith et al. | 395/156 |
| 5,208,910 | 5/1993 | Higgins et al. | 395/156 |
| 5,276,795 | 1/1994 | Hoeber et al. | 395/156 |
| 5,345,550 | 9/1994 | Bloomfield | 395/156 |
| 5,367,626 | 11/1994 | Morioka et aql. | 395/159 |
| 5,396,264 | 3/1995 | Falcone et al. | 345/146 |

FOREIGN PATENT DOCUMENTS

| | | |
|---|---|---|
| 61-184637 | 8/1986 | Japan . |
| 4-131963 | 5/1992 | Japan . |

OTHER PUBLICATIONS

Microsoft Windows v3.1, Microsoft Corp., 1992, screen pp. 1–3.
Microsoft Windows User's Guide v3.1, Microsoft Corp., 1992, pp. 3–13.

Primary Examiner—Mark R. Powell
Assistant Examiner—John E. Breene
Attorney, Agent, or Firm—Staas & Halsey

[57] ABSTRACT

A command processing system operational under graphical user interface circumstances in a computer system having a display unit and a pointing device. An object display control portion causes the display unit to display items identifying objects which can be processed, and a selecting portion selects an item representing an object, among the items displayed on said display unit, by manipulating the pointing device. A command display control portion causes the display unit to display a single command, selected from among commands applicable to the object, represented by the item selected by the selecting portion. When an operation for selecting the command displayed by the display unit is carried out, by manipulating the pointing device, a process represented by the displayed command is executed by the computer system.

8 Claims, 11 Drawing Sheets

| HEAD | 1 | "START" COMMAND FOR WORD PROCESSING |
|---|---|---|
| | 2 | "COPY" COMMAND |
| | 3 | "MOVE" COMMAND |
| | 4 | "DELETE" COMMAND |
| | ⋮ | ---------------- |

|   | COMMAND | FRQ. |
|---|---|---|
| 1 | "COPY" COMMAND | 10 |
| 2 | "PASTE" COMMAND | 10 |
| 3 | "MOVE" COMMAND | 10 |
| 4 | "DELETE" COMMAND | 11 |

FIG.10B

|   | COMMAND | FRQ. |
|---|---|---|
| 1 | "DELETE" COMMAND | 11 |
| 2 | "COPY" COMMAND | 10 |
| 3 | "PASTE" COMMAND | 10 |
| 4 | "MOVE" COMMAND | 10 |

COMMAND PROCESSING SYSTEM USED UNDER GRAPHICAL USER INTERFACE UTILIZING POINTING DEVICE FOR SELECTION AND DISPLAY OF COMMAND WITH EXECUTION OF CORRESPONDING PROCESS

BACKGROUND OF THE INVENTION (1) Field of the Invention

The present invention generally relates to a command processing system and, more specifically, to a command processing system used under graphical user interface (GUI) circumstances.

In a computer system, to improve the operability thereof, there are provided some GUI circumstances. In a case where a process is executed under the GUI circumstances, an operation for selecting an object to which a command is to be applied and an operation for selecting a command representing the process to be executed must be performed. The above selecting operations are an important factor for the usability of the computer system. Thus, by simplifying the selecting operations regarding the commands representing processes to be executed, the operability of the computer system can be improved.

(2) Description of the Prior Art

In a conventional command processing system used under the GUI circumstances, first, a user manipulates a pointing device, such as a mouse, so that, on a display screen, a cursor is placed on an icon corresponding to an object to which a process represented by a command is to be applied and the object is selected. A menu regarding the selected object is then displayed on the screen, and a command included in the menu is selected by use of the pointing device.

To delete a file from the system, a user performs, for example, the following operations.

Figure 1A:
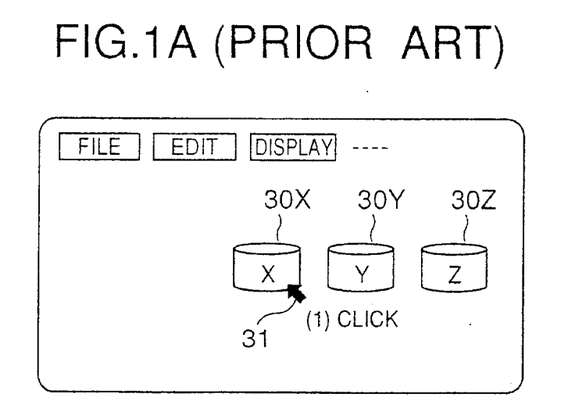
FIG. 1A is a diagram illustrating a display screen on which is displayed an operation for selecting an object among from a plurality of objects.
Figure 1B:
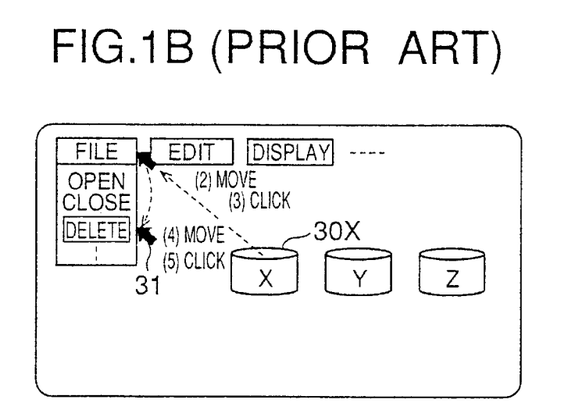
FIG. 1B is a diagram illustrating a display screen which a pull-down menu is opened.
Figure 1C:
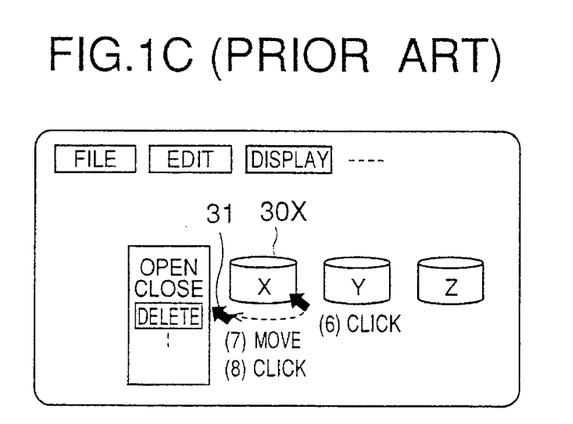
FIG. 1C is a diagram illustrating a display screen which a pop-up menu is opened.

FIG.1A shows a screen on which an object is selected, and FIG. 1B shows operations to display a pull-down menu on a display-screen. The pull-down menu is located at a predetermined position on the display-screen. FIG.1C shows operations to display a pop-up menu on a display-screen. The pop-up menu can be moved on the display-screen.

In a case using the pull-down menu, the operations are performed as follows.

(1) Manipulating the mouse, a cursor 31 is located on an icon of an object 31X (a file) to be deleted as shown in FIG.1A, and a mouse button is clicked.

(2) Manipulating the mouse, the cursor 31 is moved to a menu bar on which menu titles are indicated, as shown in FIG.1B.

(3) The cursor 31 is located on a menu title "FILE" and the mouse button is clicked, so that the pull-down menu "FILE MENU" is opened as shown in FIG.1B.

(4) Manipulating the mouse, the cursor 31 is moved to a "DELETE" command in the pull-down menu as shown in FIG.1B.

(5) The mouse button is clicked, so that the "DELETE" command is selected as shown in FIG.1B.

In a case using the pop-up menu, the operations are performed as follows.

(1) The mouse button is clicked in a state where the cursor 31 is located at the icon of the object 30X, so that the object 30X is selected.

(6) The mouse button is further clicked at this position, so that the pop-up menu is opened, as shown in FIG.1C. The pop-up menu includes, for example, all commands representing processes which can be performed.

(7) Manipulating the mouse, the cursor 31 is moved to the "DELETE" command in the pop-up menu, as shown in FIG.1C.

(8) The mouse button is clicked, so that the "DELETE" command is selected.

As has been described above, in the conventional command processing system:

the cursor 31 is moved to the object to which the process represented by the command is to be applied, the mouse button is clicked so that the object is selected, the cursor 31 is moved to the menu bar on which the main menu is indicated, the mouse button is clicked so that the pull-down menu or the pop-up menu is displayed, the cursor 31 is moved to a command, and the mouse button is clicked so that the command is selected. If there are a plurality of files to be deleted, the above operations are repeated for a number of files.

Figure 2:
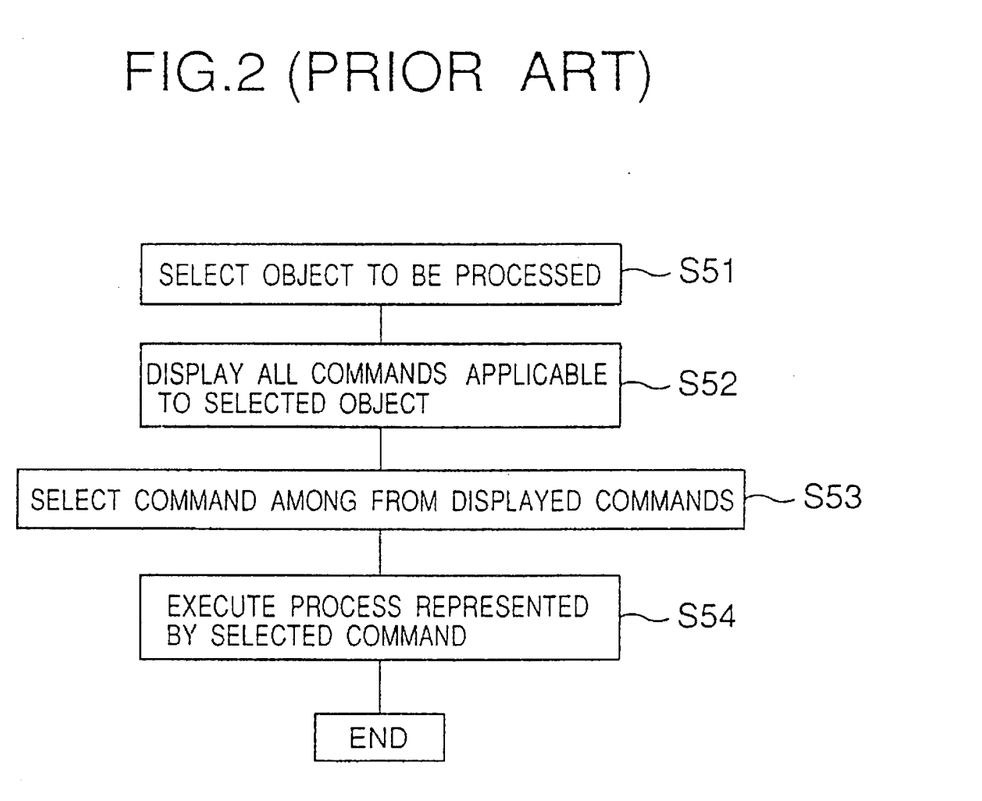
FIG. 2 is a flow chart illustrating a procedure of a conventional command processing.

FIG.2 shows a procedure of the conventional command processing under the GUI circumstances.

Referring to FIG.2, an object to be processed is selected in step S51, and all commands, out of commands prepared in the system and which can be applied to the selected object, are displayed in step S52. A command representing a process to be executed is selected among from the displayed commands in step S53. After this, the process represented by the selected command is executed in step S54.

The above procedure of the command processing is performed every time a process represented by a command is executed.

In the conventional command processing system, when processes presented by a plurality of commands are continuously executed, operations for each command are repeated by a number of commands. In the operations for each command, to select the command, a large number of manipulations of the mouse must be performed, along with looking at the display-screen. The operation in which the cursor is moved by manipulating the mouse is harder for the user than simply a pushing operation of the mouse button.

In addition, even if there is only one command applied to an object, an operation in which a menu is opened to select the object is not omitted. As a result, the operations for selecting the command are prolix.

SUMMARY OF THE INVENTION

Accordingly, a general object of the present invention is to provide a novel and useful command processing system in which the disadvantages of the aforementioned prior art are eliminated.

A more specific object of the present invention is to be provide a command processing system in which a process for a command can be executed with simple operations as much as possible under the GUI circumstances.

The above objects of the present invention are achieved by a command processing system used under a graphical user interface circumstances in a computer system having a display unit and a pointing device, the command processing system comprising: object display control means for causing the display unit to display items identifying objects which can be processed; selecting means for selecting an item representing an object, from among the items displayed on the display unit, by manipulating the pointing device; and command display control means for causing the display unit to display a single command, selected from among commands applicable to the object represented by the item selected by the selecting means, wherein when an operation for selecting the command displayed by the display unit is carried out by manipulating the pointing device, a process represented by the displayed command is executed in the computer system.

According to the present invention, when an object to be processed is selected, a single command, selected from among commands applicable to the selected object, is displayed by the display means. When the operation for selecting the displayed command is carried out, a process represented by the display command is executed in the computer system. Thus, if the single command is usually used for the selected object, the operation for selecting the command for the selected object can be simplified.

Additional objects, features and advantages of the present invention will apparent from the following detailed description when read in conjunction with the accompanying drawings.

DESCRIPTION OF THE PREFERRED EMBODIMENTS

A description will be given, with reference to FIGS. 3, 4A, 4B, 4C, and 5, of the principle of the command processing system according to the present invention.

Figure 3:
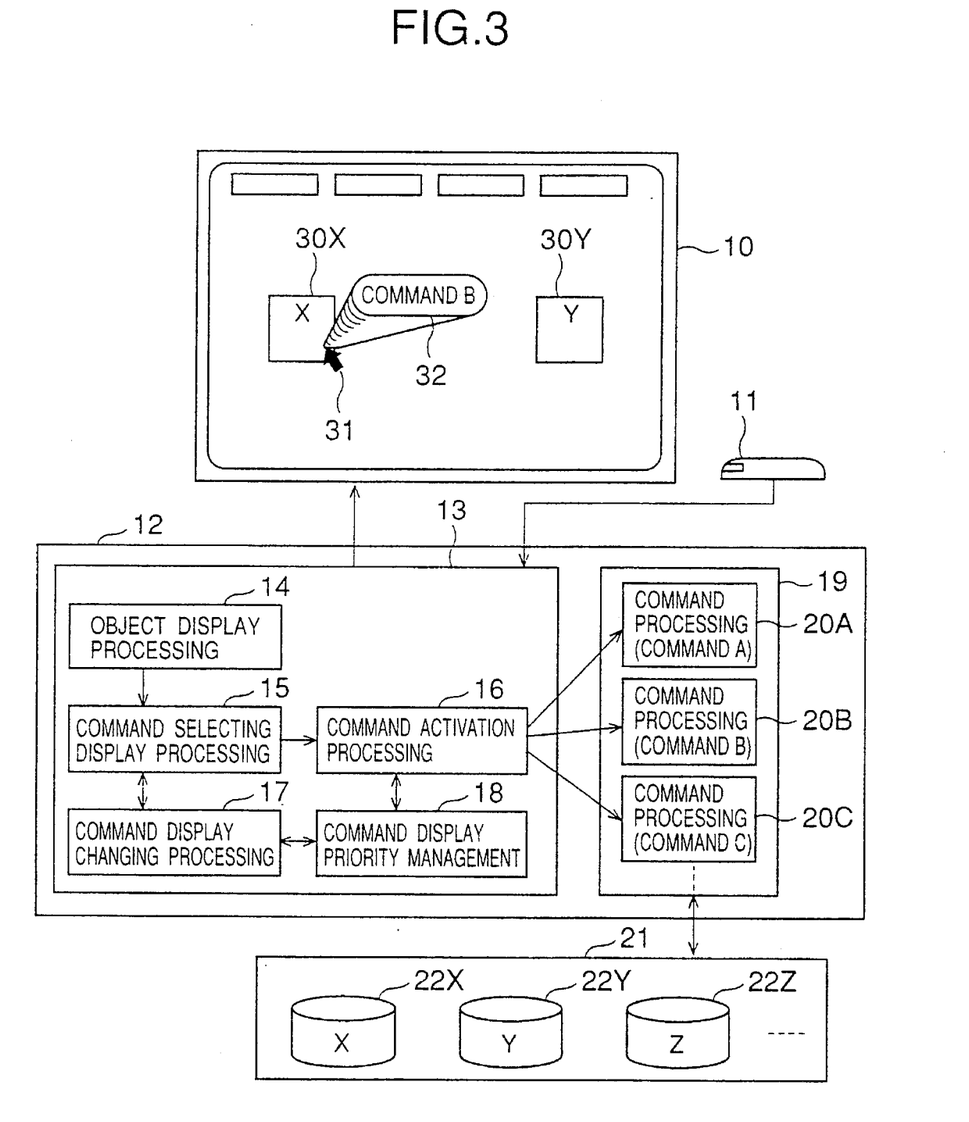
FIG. 3 is a block diagram illustrating the principle of a command processing system according to the present invention.

Referring to FIG. 3, a display unit 10 such as a CRT or a liquid crystal display panel and a pointing device 11 such as mouse are coupled to a processing unit 12. The processing unit 12 is also coupled to an object storage 21 storing objects 22X, 22Y and 22Z. Object icons 30X and 30Y respectively identifying the objects 22X and 22Y and a cursor 31 indicating an operating position and moved by the pointing device 11 are displayed on the display unit 10.

The processing unit 12 is formed of a CPU, memories and the like and has a GUI portion 13 and a command group 19. The GUI portion 13 has an object display processing portion 14, a command selecting display processing portion 15, a command activation processing portion 16, a command display changing processing portion 17 and a command display priority management portion 18.

The object display processing portion 14 causes characters and icons, identifying objects to which commands are to be applied, to be displayed on the display unit 10. Contents of an area identified on the display screen may be an object. The command selecting display processing portion 15 selects a command, from among commands which can be applied to an object pointed out by the pointing device 11, and causes the selected command to be displayed by the display unit 10. The command activation processing portion 16 activates a specific one of command processing portion 20A to 20C, which should execute a process represented by a corresponding command, in response to the instruction of execution for that command. When a changing instruction occurs in a state where a selected command is being displayed by the display unit, the command display changing unit 17 changes the command displayed by the display unit 10 to another command which can be applied to the selected object. The command display priority management portion 18 determines the priority with which a command is selected, from among commands capable of being applied to the selected object, based on a state of system in which a process represented by the previous command has been executed or the on a frequency of use of each command.

The command group 19 includes a plurality of command processing portions 20A, 20B, 20C, . . . which are prepared under the GUI circumstances. Each of the command processing portions 20A, 20B, 20C, . . . comprises a unit for executing processes represented by commands applicable to objects which are resources in the computer system.

When a cursor 31 is moved to the object icon 30X on the display screen by the manipulation of the pointing device 11 so that the object 22X is selected, a "command B", which is one of commands applicable to the selected object 22X, is automatically displayed in a command area 32. As a result, a process represented by the "command B" is immediately executed without the selecting operation of the "command B". If only the "command B" is applicable to the object 22X, the wasteful operation for selecting the "command B" can be omitted. When the cursor 31 is moved and separated from the object icon 30X by the manipulation of the pointing device 11, the command area 32 is cleared from the display screen.

When the pointing device 11 (the mouse) is clicked in this state, another command, which is decided based on using a history of commands, is displayed. In this case, an operation for moving a cursor 31 to the menu bar, an operation for selecting a menu from the menu bar and an operation for moving cursor 31 to select a command in the pull-down menu or in the pop-up menu can be omitted.

In the above case, the command may be changed in accordance with a predetermined priority. The priority may be determined based on the previous command or the frequency of use of each command. In this case, a number of times at which the command is changed can be decreased.

A description will now be given, with reference to FIGS. 4 and 5, of an example of a procedure of command processing.

For example, in a case where an "OPEN" command is prior to a "DELETE" command, among the commands applicable to a file (the object X), the operation is performed using a mouse (the pointing device 11) as follows.

Figure 4A:
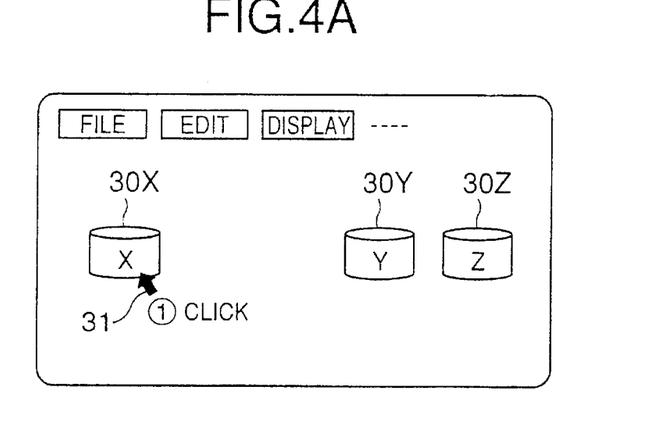
FIG. 4A is a diagram illustrating a display screen on which is displayed an operation for selecting an object from among a plurality of objects, in the command processing system according to the present invention.

(1) The cursor 31 is moved to the object icon 30X representing the object X to be processed, by the manipulation of the mouse as shown in FIG. 4A. In a state where the cursor 31 points out the object icon 30X, the mouse button is clicked, so that the object X is selected.

Figure 4B:
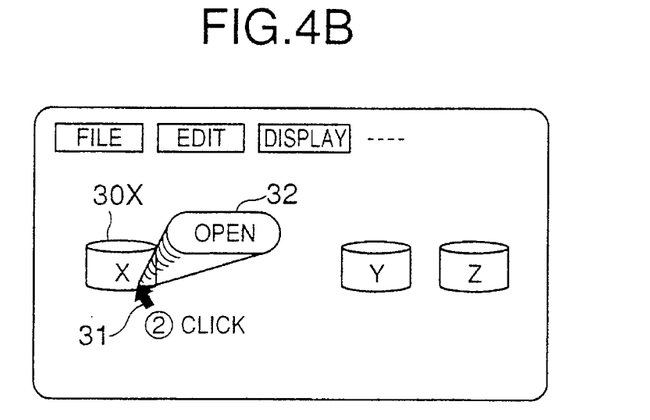
FIG. 4B and 4C are diagrams illustrating a display screen on which commands are selected for the selected objects.
Figure 4C:
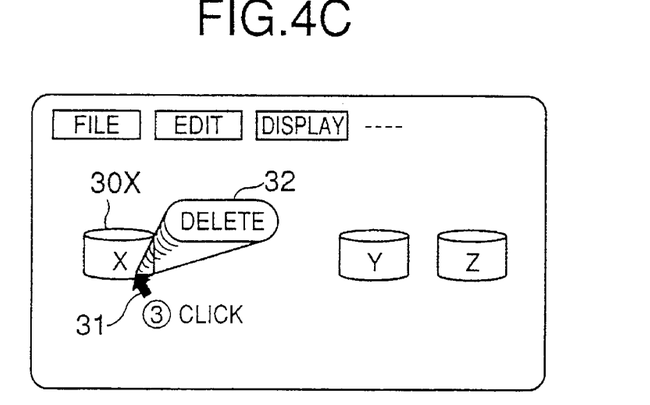

(2) When the object X is selected, a command having the highest priority, among commands applicable to the object X, is displayed in the command area 32, as shown in FIG. 4B. In this example, the command having the highest priority is the "OPEN" command. If a user wishes to open the file (the object X), the mouse button is clicked by the user in this state, so that the process represented by the "OPEN" command is immediately executed without moving the cursor 31.

On the other hand, if the user wishes to select anther command, for example, the "DELETE" command, the cursor 31 is moved to the menu bar in the same manner as in the conventional case and the file menu is opened. After this, the "DELETE" command is selected in the pull-down menu by the manipulation of the mouse. As a result, the process represented by the "DELETE" command is executed, so that the file (the object X) is deleted from this system.

In this example, the "DELETE" command can be also selected as follows.

(3) An instruction for changing the command is supplied to the system in a state shown in FIG. 4B. This instruction is carried out, for example, by click of a second button other than the button used to selecting items and the like. Due to the instruction for changing the command, the command displayed in the command area 32 is successively changed from the "OPEN" command to a "CLOSE" command, the "DELETE" command, . . . . The command is changed one by one, for instruction for changing the command supplied to the system. When the second button of the mouse is clicked in a state where the "DELETE" command is displayed in the command area 32, the "DELETE" command is selected. As a result, the process represented by the "DELETE" command is executed, so that the file is deleted from this system.

Figure 5:
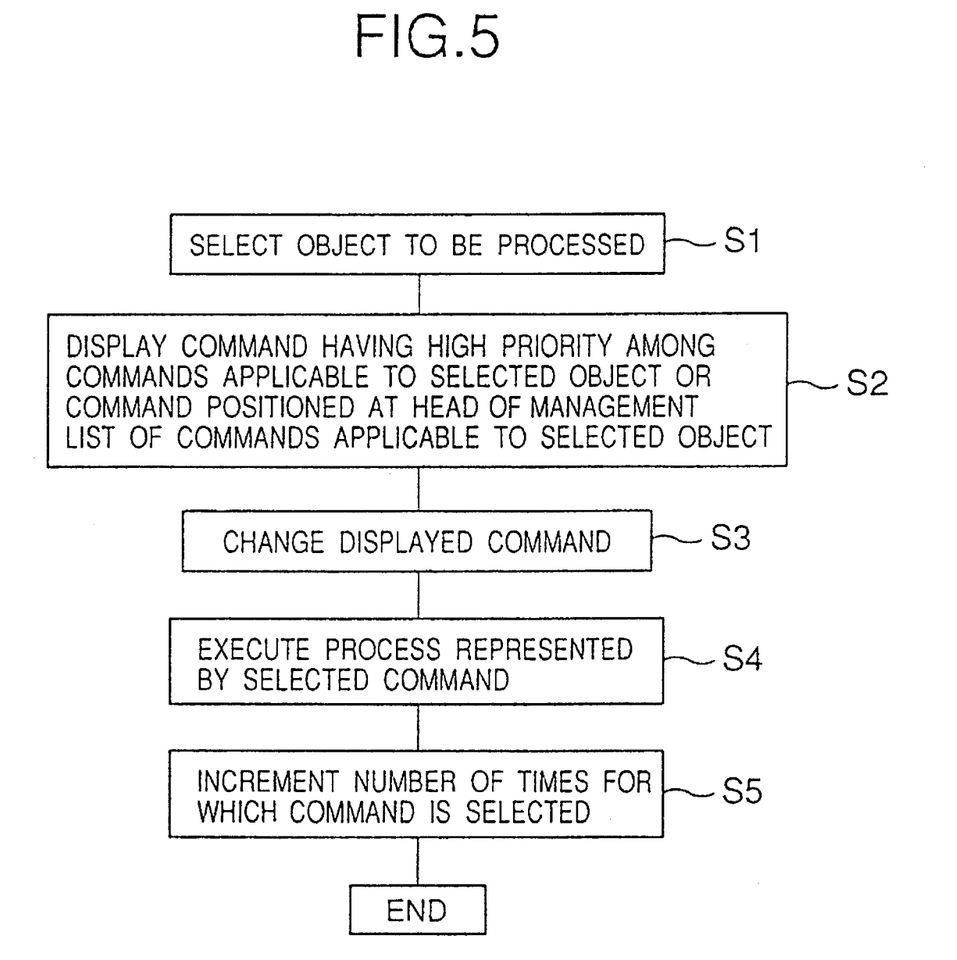
FIG. 5 is a flow chart illustrating a procedure of command processing, according to the present invention.

FIG. 5 shows a flow chart indicating the above procedure for command processing.

Referring to FIG. 5, an object to be processed is selected in step S1. A command having a higher priority, among commands applicable to the selected object, or a command positioned at a head of a management list of commands applicable to the selected object, is displayed in the command area 32, in step S2.

Every time the instruction for changing the command to be displayed is supplied to the system, the command displayed in the command area 32 is changed, in step S3. The changing order in which the command is changed is determined by the command display priority management portion 18, based on the frequency of use of each command and/or a state of this system in which the process represented by the previously selected command has been executed, which state is represented, for example, by an operation history. A process represented by the command displayed in the command area 32 is executed, in step S4. In step 5, a number of times for which the command is selected is incremented by one, and the command display priority management portion 18 collects information regarding the number of times of use to determine an order of priority for the display of the next command.

As has been described above, after the cursor 31 is moved to the object icon for the object to be processed and the object is selected, the command can be selected, in a state in which the cursor 31 is in the current position, and thus without further moving the cursor 31.

In addition, if a signal command is applicable to the object to be processed, or if a command desired by the user is initially displayed in the command area 32, the command can be immediately selected, without further operations for changing the command displayed in the command area 32.

A description will now be given of an embodiment of the present invention.

Figure 6:
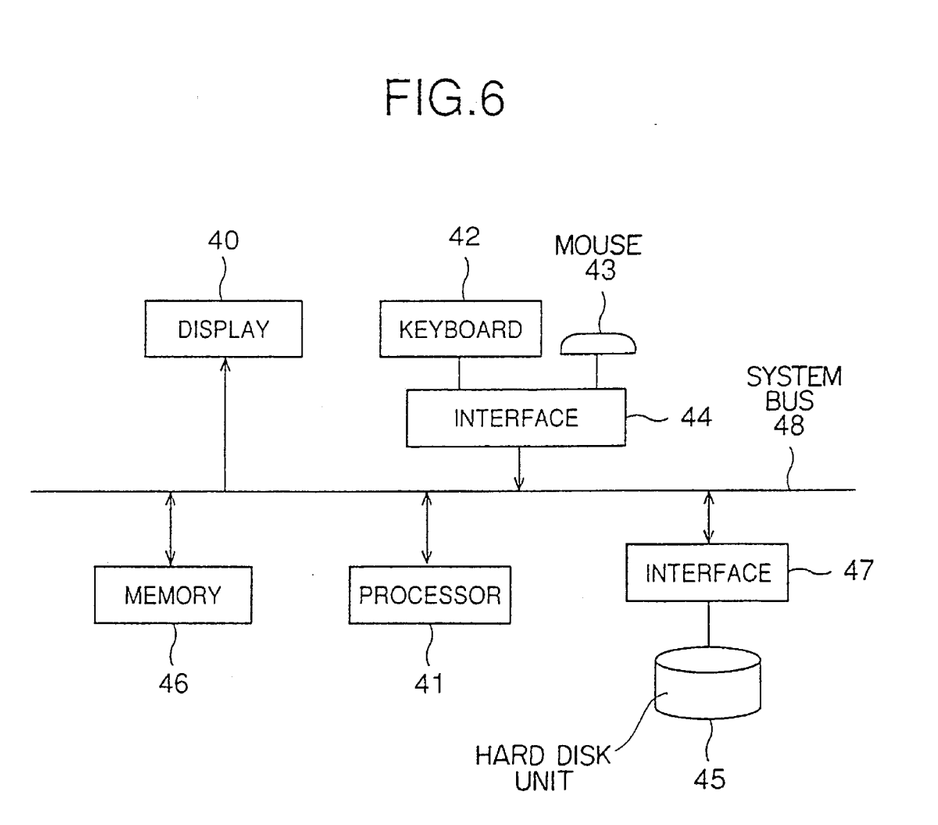
FIG. 6 is a block diagram illustrating an example of a computer system to which the command processing system of the invention is applied.

FIG. 6 shows a computer system including the command processing system according to the present invention. Referring to FIG. 6, the computer system has a display unit 40, a processor 41, a keyboard 42, a mouse 43, a hard disk unit 45 and a memory 46. The processor 41, the display unit 40 and the memory 46 are connected to a system bus 48. The keyboard and the mouse 43 are coupled to the system bus via an interface circuit 44. The hard disk unit 45 is coupled to the system bus 48 via an interface circuit 47. The processor 41 has the same functions as the processing unit 12 shown in FIG. 3. The hard disk unit 45 corresponds to the object storage 21 shown in FIG. 3 and stores objects (files). When the mouse 43 is manipulated, information generated by the mouse 43 is supplied to the processor 41 via the interface 44 and the system bus 48. An object (a file) which is read out from the hard disk unit 45 is supplied to the memory 45 via the interface 47 and the system bus 48 and is stored in the memory 45 to process the object (the file).

Figure 7:
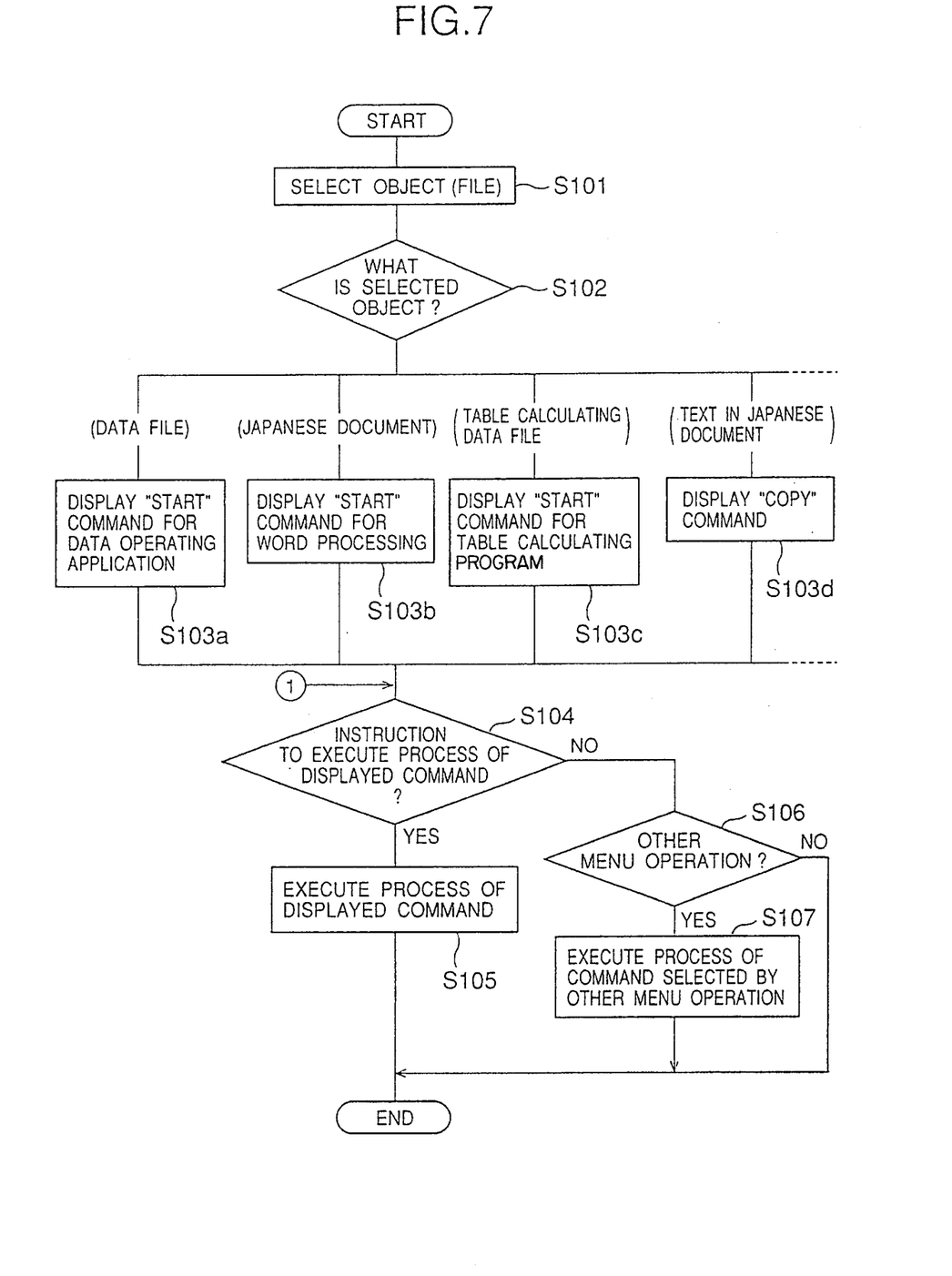
FIG. 7 is a flow chart illustrating a first example of the procedure of the command operation.

In the command processing system of this embodiment, the command processing is performed by the processor 41 in accordance with a flow chart shown FIG. 7.

Initially, icons for objects (files) are displayed on a display screen of the display unit 40 as shown in FIG. 4A In this case, a "Data File", a "Japanese Document a", "Table Calculating Data File" and a "Text in Japanese Document" are set as the objects in this computer system.

Referring to FIG. 7, an object is selected by the manipulating the mouse 43 in step S101. It is determined, in step S102, what the selected object is. If the "Data File" is selected as the object to be processed by the manipulation of the mouse 43, a "START" command for a data operating application program is preferentially displayed, in step S103a, on the display screen of the display unit 40 in such a manner as shown in FIG. 4B. If the "Japanese Document" is selected as the object to be processed by the manipulation of the mouse 43, a "START" command for word processing is preferentially displayed, in step S103b, on the display screen of the display unit 40. If the "Table Calculating Data File" is selected as the object to be processed, by the manipulation of the mouse 43, a "START" command for a table calculating program is preferentially displayed, in step S103c, on the display screen of the display unit 40. Further, if the "Text in Japanese Document" is selected as the object to be processed, a "COPY" command is preferentially displayed, in step S103d, on the display screen of the display unit 40.

In a state where the command is displayed on the display screen as shown in FIG. 4B, it is determined, in step S104, whether or not an introduction to execute a process represented by the displayed command is supplied to this system by the user. If the instruction is supplied to this system, the process represented by the displayed command is executed. For example, in a case where the "Data File" is selected as the object to be processed, the process represented by the "START" command is executed. That is, the data operating application program starts, so that the data file is opened.

On the other hand, if the instruction to execute a process represented by the display command is not supplied to this system, it is determined, in step S106, whether or not another menu operation using the mouse 43 is carried out. If the other menu operation is carried out, a process of a command selected by the other menu operation is executed, in step S107. However, if it is determined, in step S106, that the other menu operation is not to be carried out, the command processing is directly terminated.

According to the command processing shown in FIG. 7, when an object is selected, a predetermined command is preferentially displayed, without any further operation for selecting the command. Thus, the operation for selecting the command can be simplified.

Figure 8A:
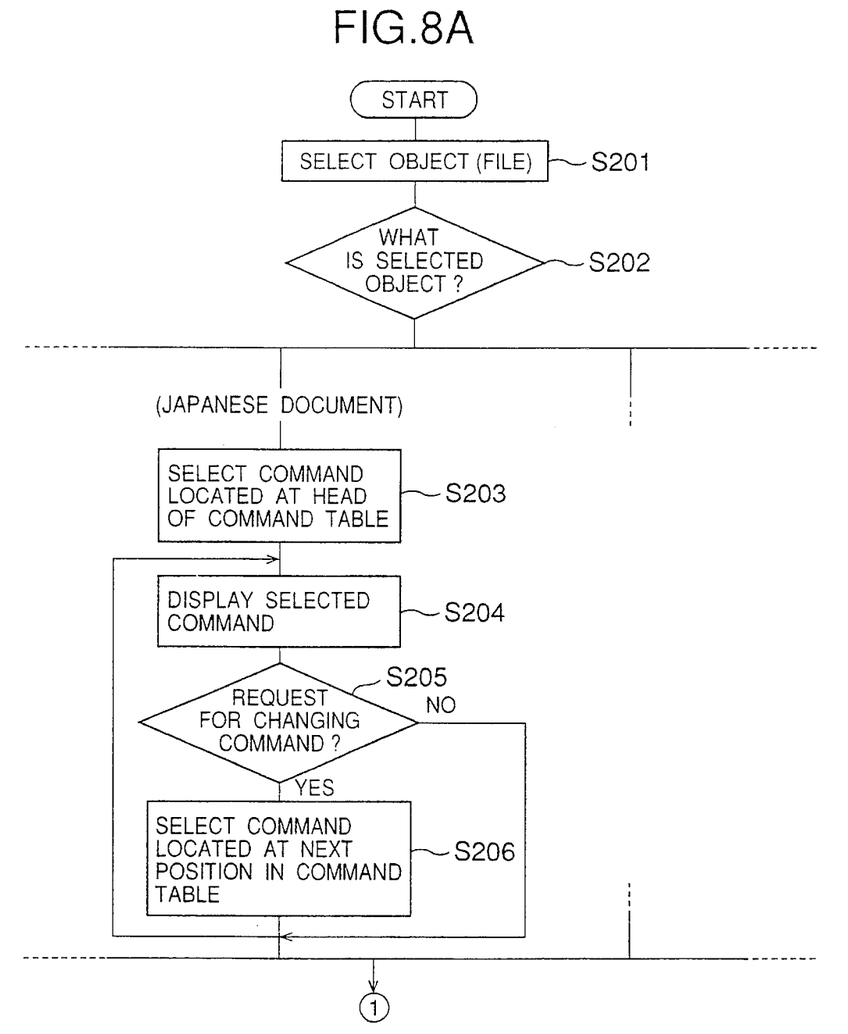
FIG. 8A is a flow chart illustrating a second example of the procedure of the command operation.
Figure 8B:
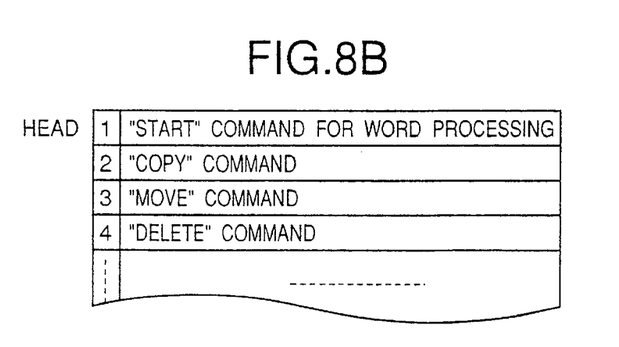
FIG. 8B is a diagram illustrating an example of a command table.

Further, another example of the command processing may be carried out in accordance with a flow chart shown in FIG. 8A. In this case, a command table is employed, in which commands applicable to a selected object are listed in a priority order, as shown in FIG. 8B. In FIG. 8B, the higher the position at which a command is located in the command table, the higher the priority.

Referring to FIG. 8A, initially, an object is selected in step S201 by the manipulating the mouse 43, and it is then determined, in step S202, what the selected object is, in the same manner as in the case shown in FIG. 7. After this, if the "Japanese Document" is selected as the object to be processed, the "START" command for the word processing, which command is located at the head of the command table shown in FIG. 8B, is preferentially selected in step S203. The selected "START" command is displayed, in step S204, on the display screen of the display unit as shown in FIG. 4B. After this, it is determined, in step S205, whether or not a request for changing the displayed command is supplied from the user to this system using the mouse 43. If the request for changing the displayed command is not supplied to this system, the process proceeds to step S104 shown in FIG. 7. As a result, after this, the same steps as those in the case shown in FIG. 7 is carried out. That are, for example, the process represented by the "START" command displayed on the display screen is executed, so that the Japanese document is opened under a condition in which the word processing can be carried out.

On the other hand, if it is determined, in step S205, that the request for changing the displayed command is supplied to this system, a command located at the next position in the command table shown in FIG. 8B is selected, in step S206. That is, in this case, a "COPY" command is selected. As a result, the displayed command is changed from the "START" command to the "COPY" command in step S204, and it is then determined, in step S205, whether or not the request for changing the displayed command is supplied to this system. After this, every time the request for changing the command is supplied to this system, the command displayed on the display screen is changed to a command located at the next position in the command table.

In the above, if the operation for selecting the displayed command is performed instead of supplying the request for changing the command, the process proceeds to step S104 shown in FIG. 7. As a result, a process represented by the displayed command is executed.

In the command processing as shown in FIG. 8A, when an object is selected, a command is selected in accordance with an order in which the commands applicable to the selected object are listed in the command table shown in FIG. 8B. If the commands are listed in the command table in accordance with a statistical probability of use, a command having a high statistical probability of use is preferentially selected. Thus, the operation for selecting a command, from among commands which can be applied to the selected object, can be simplified.

Figure 9A:
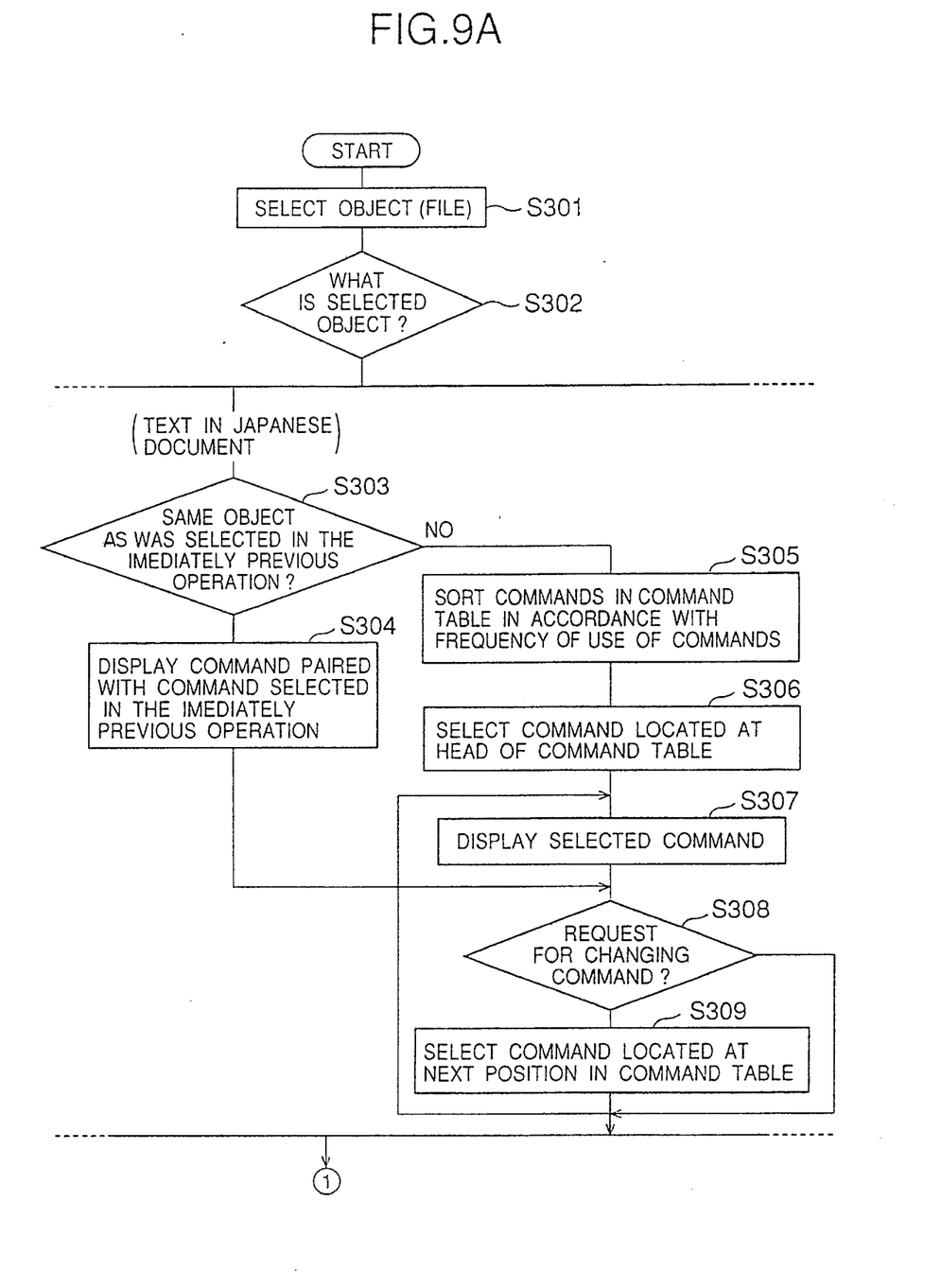
FIGS. 9A and 9B are flow charts illustrating a third embodiment of the procedure of the command processing.
Figure 9B:
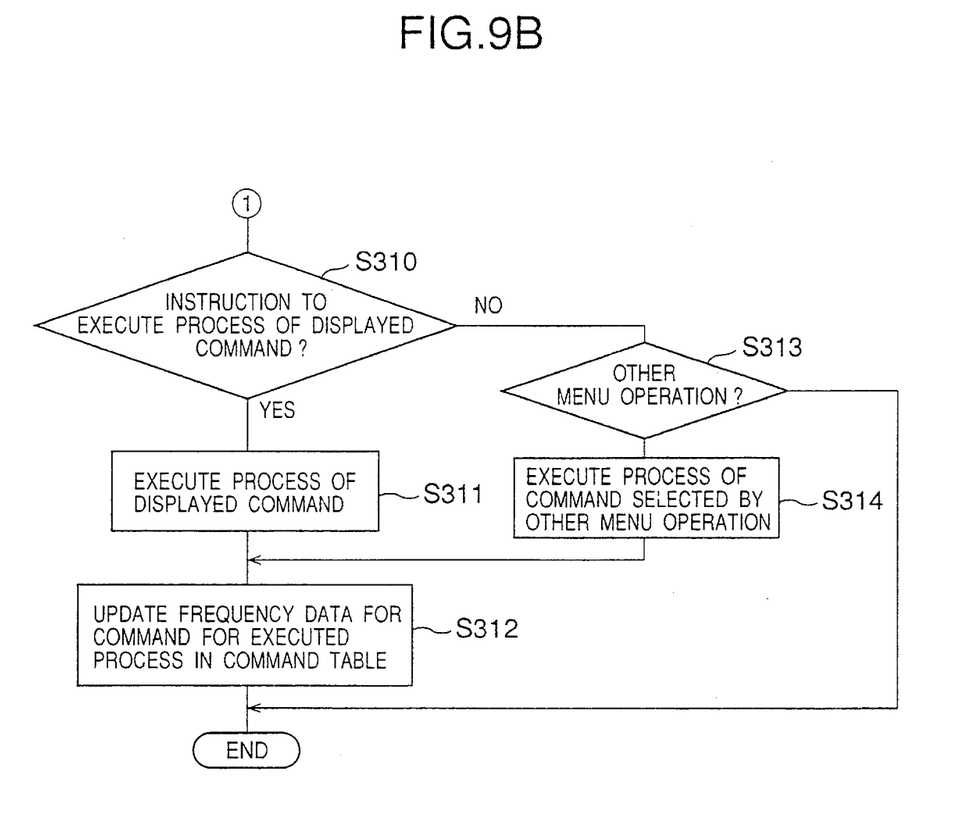
Figure 10A:
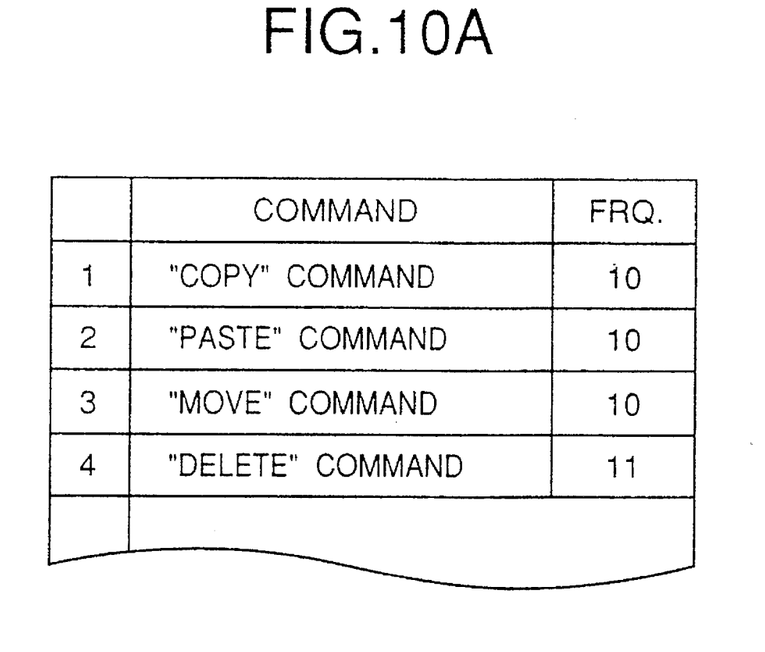
FIGS. 10A and 10B are diagrams illustrating other embodiments of the command table.

Further, another example of the command processing may be carried out in accordance with a flow chart shown in FIGS. 9A and 9B. In this case, a command table, in which commands applicable to a selected object are listed, is shown in FIG. 10A. In FIG. 10A, frequency data ("FRQ") is added to each of the commands. The frequency data represents a frequency with which a corresponding command has been selected.

Referring to FIG. 9A, initially, an object is selected in step S301 by the manipulating the mouse 43, and it is then determined, in step S302, what the selected command is, in the same manner as in the cases shown in FIGS.7 and 8A. After this, if the "Text in Japanese Document" is selected as the object to be processed, it is determined, in step S303, whether or not the same object (the "Text in Japanese Document") was selected in the immediately previous operation. If the same object was selected in the immediately previous operation, a command paired with a command selected in the immediately previous operation is displayed, in step S304, on the display screen of the display unit 40. For example, if a "COPY" command was selected in the immediately previous operation, a "PASTE" command paired with the "COPY" command is displayed on the display screen as shown in FIG. 4B. Since the "PASTE" command is usually selected after the process represented by the "COPY" command is executed, the "PASTE" command is automatically displayed in a case where the "COPY" command was selected in the immediately previous operation. As a result, in many cases, the operation for selecting the "PASTE" command paired with the "COPY" command can be omitted.

Figure 10B:
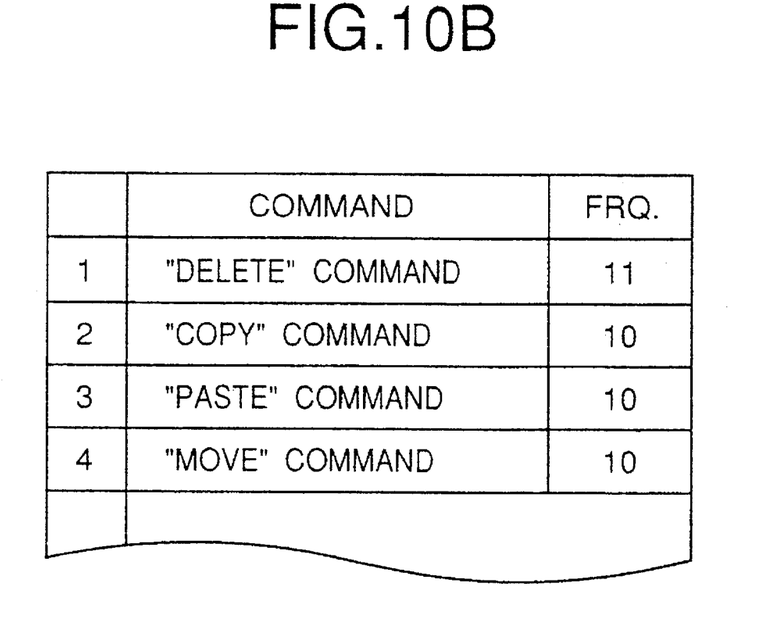

On the other hand, if the same object (the "Text in Japanese Document") was not selected in the immediately previous operation, commands listed in the command table shown in FIG. 10A are sorted in accordance with the frequency of use of commands, in step S305. As a result, the command table is updated as shown in FIG. 10B so that a command having the maximum frequency is located at the head of the command table. The command located at the head of the command table is selected in step S306. In this case, a "DELETE" command is selected. The selected command is then displayed, in step S307, on the display screen of the display unit 40 as shown in FIG. 4B.

In a state in which the command is displayed on the display screen, it is determined, in step S308, whether or not a request for changing the displayed command is supplied to this system. If the request for changing the displayed command is supplied to this system, a command located at the next position in the command table shown in FIG. 10B is selected in step S309. The command selected in step S309 is displayed in step S307, so that the displayed command is changed. In this case, the displayed command is changed from the "DELETE" command to the "COPY" command.

After this, every time a request for changing the displayed command is supplied to this system, the displayed command is changed (steps S309, S307 and S308).

If the request for changing the displayed command is not supplied to this system, the command processing proceeds to step S310 shown in FIG. 9B. Referring to FIG. 9B, steps S310, S311, S313, S314 respectively correspond to steps S104, S105, S106 and S107 shown in FIG. 7. That is, if the instruction for executing a process represented by the displayed command is supplied to this system, the process represented by the displayed command is executed in step S311. In a case where the "DELETE" command is displayed, the "Text in Japanese Document" is deleted, or in a case where the "COPY" command is displayed, the "Text in Japanese Document" is copied. After this, the frequency data for the command for the executed process in the command table is updated so as to be incremented by one, in step S312. For example, in the case where the "Text in Japanese Document" is deleted, the frequency data for the "DELETE" is updated to "12".

On the other hand, if the instruction for executing the process represented by the displayed command is not supplied to this system, steps regarding the other menu operation are performed in the same manner as in the case shown in FIG. 7.

According to the command processing as shown in FIGS. 9A and 9B, when an object is selected, a command having a high frequency of use is automatically, preferentially selected from among commands which can be applied to the corresponding selected objects. Thus, the operation for selecting a command can be simplified.

A command which was selected in the previous operation may be preferentially selected. In this case, if the command is used repeatedly, the operation for selecting the command can be simplified.

The present invention is not limited to the aforementioned embodiments, and variations and modifications may be made without departing from the scope of the claimed invention.

What is claimed is:

1. A command processing system operational under graphical user interface circumstances in a computer system having a display unit and a pointing device, said command processing system comprising:

object display control means for causing said display unit to display items identifying objects which can be processed;

selecting means for selecting an item representing an object, among the items displayed on said display unit, by manipulating said pointing device;

command display control means for causing said display unit to display a single command, selected from among commands applicable to the object represented by the item selected by said selecting means; and display changing means for changing the displayed command to another command, determined from among the commands applicable to the selected object, wherein when an operation for selecting the command displayed by the display unit is carried out by manipulating said pointing device, a process represented by the displayed command is executed by said computer system.

2. The command processing system as claimed in claim 1, further comprising:

management means for determining the single command, selected to be initially displayed by said display unit under control of said command display control means, and the another command, to which a currently displayed command is to be changed by said display changing means, in accordance with respective and predetermined relative priorities.

3. The command processing system as claimed in claim 2, wherein the predetermined, relative priorities depend on the corresponding respective frequencies of use of the respective commands.

4. The command processing system as claimed in claim 2, wherein said management means has a command table in which the commands applicable to each object are listed in an order corresponding to respective and predetermined relative priorities and determines, as the command to be initially displayed, a command having a highest priority among the commands listed in said command table for the selected object and, as the another command to which the displayed command is to be changed, the command of the next lower relative priority of the commands listed in said command table.

5. The command processing system as claimed in claim 2, wherein respective frequency data representing corresponding frequencies of use of the commands are assigned to the commands listed in the command table, the predetermined priority of each command depending on the frequency data for that command relative to the respective frequency data for the other commands listed in the command table.

6. The command processing system as claimed in claim 2, wherein said management means determines the command to be initially displayed, based on a command which was selected in a previous operation.

7. The command processing system as claimed in claim 6, wherein said management means determines, as the command to be initially displayed, a command paired with the command which was selected in the previous operation.

8. The command processing system as claimed in claim 6, wherein said management means determines, as the command to be initially displayed, the command which was selected in the previous operation.

* * * * *

UNITED STATES PATENT AND TRADEMARK OFFICE
CERTIFICATE OF CORRECTION

PATENT NO. : 5,598,522
DATED : Jan. 28, 1997
INVENTOR(S) : INATOMI

It is certified that error appears in the above-indentified patent and that said Letters Patent is hereby corrected as shown below:

Col. 3,     line 29, after "screen" insert --on--;
           line 31, after "screen" insert --on--.

Col. 4,     line 25, change "portion" to --portions--;
           line 38, change "or the on" to --or on--.

Col. 5,     line 43, after "changed" insert --,--;
           line 44, change "for instruction" to --for every instruction--;
           line 57, after "commands" insert --,--.

Col. 6,     line 44, after "4A" insert --.--;
           line 45, change "Document a"," to --Document", a--.

Col. 7,     line 47, change "is carried" to --are carried--; and change "That are," to --That is,--.

Signed and Sealed this

Twenty-fourth Day of June, 1997

*Attest:*

BRUCE LEHMAN

*Attesting Officer*      *Commissioner of Patents and Trademarks*